Figure 1:
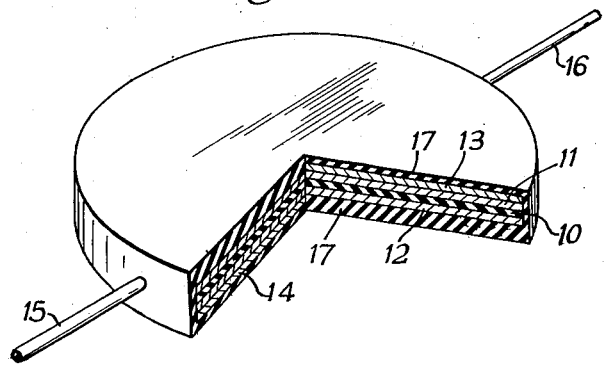

May 9, 1961 D. H. MASH 2,983,837
ELECTROLUMINESCENT LAMP
Filed May 10, 1955

INVENTOR:
DEREK HUBERT MASH,
BY Lawrence Burns,
ATTORNEY

United States Patent Office

2,983,837
Patented May 9, 1961

2,983,837

ELECTROLUMINESCENT LAMP

Derek Hubert Mash, London, England, assignor to Thorn Electrical Industries Limited, London, England Filed May 10, 1955, Ser. No. 507,384

Claims priority, application Great Britain May 10, 1954

7 Claims. (Cl. 313—108)

This invention relates to capacitors and the like, that is to say to capacitors and to devices which while not normally known as capacitors are in fact capacitors. For example, electroluminescent devices, that is to say devices of the kind in which light is produced upon the excitation of a material to luminescence by the application thereto of an electric field, are in fact capacitors.

An electroluminescent device comprises two spaced conductive electrodes between which an electric field can be produced, and a light-producing layer comprising electroluminescent material disposed between the two electrodes to be traversed by the exciting electric field. The device may be used as a lamp, in which case usually one, or perhaps both, of the two electrodes are capable of transmitting light. If the device is to be operated from an A.C. source the electroluminescent material of the light-producing layer is usually intimately mixed with another dielectric material.

It is normal industrial practice to assign to a capacitor a maximum voltage which should be applied between the capacitor electrodes under normal operating conditions. If this maximum voltage is exceeded there is a danger that "flash-over" between the electrodes will occur and sparks or an arc will pass between them, causing overheating of the capacitor which may be sufficient to damage or destroy it. A voltage greater than the assigned maximum value may be applied to the capacitor accidentally, or because of a fault in the circuit in which the capacitor is connected. Moreover, the capacitor may age, or otherwise develop in time a fault which reduces its safe maximum voltage.

In the case of an electroluminescent device the amount of light emitted by the light-producing layer increases as the voltage applied between the two electrodes is increased but, in practice, above an upper limit there is a danger that "flash-over" between the electrodes will occur and sparks will pass between them. In the devices known hitherto the flash-over may cause the establishment of a low-conductivity path between the two electrodes, for example, a substantially non-conductive carbonaceous material in the light-producing layer may be decomposed to conductive carbon. Such a low-conductivity path will short-circuit the device, and any resulting overheating in the region containing the path may be sufficient to constitute a fire hazard.

For a given device the upper limit for the voltage to give flash-over is reduced by the presence in the light-producing layer of bubbles of air or vapour, or of particles of foreign matter such as dust. Accordingly, elaborate precautions have been necessary in the construction of the devices to exclude such bubbles and particles. Also they have been operated at voltages which are considerably lower than the upper limit and it has not been possible to make full use of all the light which the devices are capable of producing.

The upper limit for the voltage is increased when the light-producing layer incorporates another dielectric material in addition to the electroluminescent material, but such materials which are also light-transmitting are usually of a carbonaceous nature and if flash-over does take place a conductive path is more readily formed. Irregularities, e.g. in the composition, of the dielectric material also reduce the upper limit for the voltage, and accordingly care is necessary in the preparation of the dielectric material and the light-producing layer.

An object of the present invention is to provide a capacitor or the like with which the effect of flash-over between the two electrodes can be reduced.

According to the present invention there is provided a capacitor or the like comprising two spaced conductive electrodes, wherein at least one of the electrodes comprises a material that decomposes upon being heated to a temperature higher than the ambient or normal operating temperature for the capacitor to a product or products having a considerably reduced total value of conductivity, or a material that otherwise has its conductivity considerably reduced in value upon being heated to the said higher temperature.

An electroluminescent material may be disposed between the two electrodes to be permeated by an electric field produced between the two electrodes, the electroluminescent material constituting a light-producing layer. The said light-producing layer may comprise an intimate mixture of the electroluminescent material and another dielectric material.

Preferably, the conductivity of the electrode material is reduced substantially to zero upon the material being heated to the said higher temperature. The said higher temperature is preferably higher than 200° C. and may be between 200° C. and 800° C.

The said material may be lead dioxide and/or manganese dioxide. If the dioxide forming the electrode is insufficiently conductive up to 30% thereof may be replaced by the same weight of a more highly conductive material, such as graphite or a metal. The graphite or metal and the dioxide may be disposed in different layers, the dioxide layer then being disposed nearer to the dielectric material. A binder may be employed to increase the mechanical strength of the electrode or each electrode.

Figure 2:
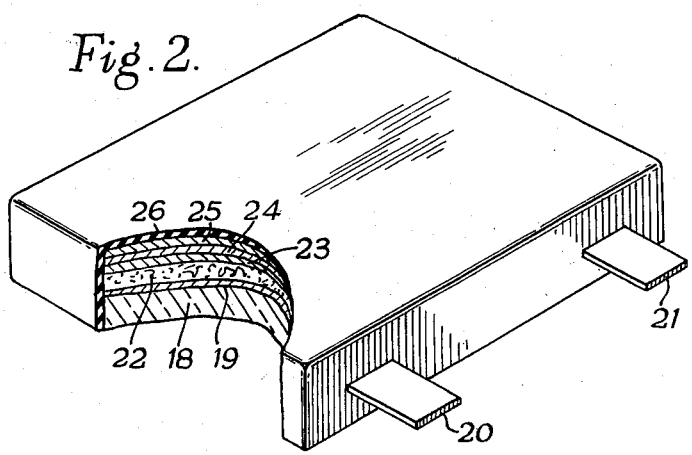

Capacitors embodying the invention will now be described, by way of example, with reference to the accompanying diagrammatic drawing wherein:

Figure 1 shows a capacitor suitable for use as such in an electric circuit, part of the capacitor being broken away to show the interior thereof, and Figure 2 shows an electroluminescent device, part of the device being broken away to show the interior thereof.

The capacitor shown in Figure 1 is particularly suitable for use in an electric discharge lamp circuit for suppressing radio interference, and comprises a circular disc 10 of a ceramic dielectric material, for example, a barium titanate material. The two conductive electrodes 11 and 12 of the capacitor are applied in the form of coatings to the two circular faces of the disc 10 and are formed from a suspension (hereinafter called the first suspension) of the following composition, which has been ball-milled for three days to bring its constituents to a fine state of division (as is preferred):

Lead dioxide _____ gms__ 133
Concentrated ammonia solution (S.G.=0.880)
                                              ccs__   5
Distilled water _____ ccs__  73

The lead dioxide should be of at least the same grade of purity as that sold under the name "Analar." "Analar" is lead oxide with the following limits of impurities: water-soluble material, 0.1%; chloride (Cl) 0.005%; sulfate ($SO_4$) 0.01%; manganese (Mn) 0.0005%; all by weight. The resulting first suspension may be applied to form the electrodes by painting, spraying, brushing or dipping. Thin layers 13 and 14 of a metal such as silver are then painted on to the coatings forming the electrodes 11 and 12 respectively to serve as terminals to which respective wire leads 15 and 16 are soldered. Preferably, as shown, the metal layers cover less than half of their respective circular faces and are not opposite one another. The capacitor is then enclosed in a layer 17 of an electrical insulating material, e.g. a wax.

Alternatively, 50 gms. of the first suspension is mixed with 25 ccs. of a 1% aqueous solution of the water soluble cellulosic compound sold under the name "Celacol" to form what will be called hereinafter the second suspension. "Celacol" is cellulose ether. The Celacol serves as a binder and the electrode formed by use of the second suspension is found to be mechanically stronger and to have a higher conductivity. The second suspension may be applied by any of the methods used for the first suspension.

The conductivity of each electrode may be increased as described above by applying over the electrode coatings a layer, such as the layers 13 and 14, of a metal, such as silver. Any other material of high conductivity, graphite for example, may be used in place of the metal. The conductivity may also be increased by adding the graphite or the metal to the first or second suspension. Preferably, not more than 30% by weight of the lead dioxide is replaced by the same weight of graphite or metal.

With capacitors prepared as described above we have found that the voltage between the electrodes can be increased beyond what was considered hitherto to be the maximum for the capacitor. Flash-over occurs in the capacitor but does not cause any appreciable permanent damage. It is believed at present that the passage of a spark or arc causes at least partial decomposition of the lead dioxide in the path of the spark or arc to constituents having a considerably reduced total value of conductivity, this resulting in the immediate isolation of the part of the dielectric material immediately surrounding the path made by the spark.

Thus, on heating lead dioxide it loses oxygen progressively, passing through the stages of lead sesquioxide ($Pb_2O_3$), red lead ($Pb_3O_4$), and finally becomes lead monoxide (PbO). Conductivity is lost before the change to $Pb_2O_3$ is complete. As far as can be seen by microscopic examination, the passage of a spark causes a puncture, surrounded by a rim of lead oxide (probably fused), and around this presumably another ring consisting of lead dioxide which is sufficiently lacking in oxygen to render it non-conducting. The heating of any graphite present by the spark may cause it to oxidise, drawing oxygen from the lead dioxide.

Reference is now made to Figure 2 which shows an electroluminescent device suitable for use as a lamp. Such a device is not normally known as a capacitor but is in fact a capacitor. The device comprises a plate 18 of a light-transmitting material, e.g. glass, provided on one face with a transparent conductive coating 19 constituting a first electrode capable of transmitting light. The conductive coating may be applied, for example, by exposing one face of a glass plate while hot to stannic chloride vapour. Two metal contact strips 20 and 21 serving as terminals for connecting the lamp to a power source are mounted on the plate, the strip 20 being in good electrical contact with the conductive coating 19 and the strip 21 being insulated therefrom. A light-producing layer is formed by applying a coating 22 comprising an intimate mixture of electroluminescent and other dielectric materials over the conductive coating 19. A light-reflecting layer 23 such as is described in my copending application No. 472,193 filed November 30, 1954 may be applied over the light-producing layer 22.

A second conductive electrode 24 is formed from the first or second suspension, the chosen suspension being applied over the light-reflecting layer 23, or the light-producing layer 22 as the case may be. The suspension may be applied to form the electrode by painting, spraying, brushing or dipping. A layer 25 of graphite is applied over the electrode 24 to ensure good electrical contact between the electrode 24 and the respective strip 21, which is in good electrical contact with the graphite layer.

The conductivity of the electrode 24 may be increased by adding graphite to the first or second suspension. Preferably, not more than 30% by weight of the lead dioxide is replaced by the same weight of graphite. The back and the edges of the lamp are coated with a layer 26 of an electrically insulating, moisture-impervious material.

With lamps prepared as described above we have found that the voltage between the lamp electrodes can be increased beyond what was considered hitherto to be the safe upper limit for such a lamp. Flash-over is seen to occur in the lamp as a momentary bright spark, but the only result of the flash-over appears to be a permanent black spot in the light-producing layer, which spot usually is too small to be seen with the unaided eye, the lamp otherwise continuing to work normally. As described above, it is believed at present that the passage of the spark causes at least partial decomposition of the lead dioxide in the path of the spark to constituents having a considerably reduced total value of conductivity, this resulting in the immediate isolation of the part of the light-producing layer immediately surrounding the path made by the spark.

I claim:

1. An electroluminescent device comprising two spaced conductive electrodes, wherein at least one of the electrodes comprises a material that changes upon being heated to a temperature higher than the normal operating temperature for the device to a material having a considerably reduced total value of conductivity, and wherein an electroluminescent material is disposed between the electrodes to be permeated by an electric field produced between the two electrodes, the electroluminescent layer constituting a light producing layer.

2. An electroluminescent device as claimed in claim 1, wherein the said light-producing layer comprises an intimate mixture of the electroluminescent material and another dielectric material.

3. An electroluminescent device as claimed in claim 2, wherein the said higher temperature is higher than 200° C.

4. An electroluminescent device as claimed in claim 3, wherein the said higher temperature is between 200° C. and 800° C.

5. An electroluminescent device as claimed in claim 4, wherein the said electrode material is selected from the group consisting of lead dioxide in a fine state of division and maganese dioxide in a fine state of division.

6. An electroluminescent device as claimed in claim 5, wherein up to 30% by weight of the dioxide is replaced by the same weight of a more highly conductive material.

7. An electroluminescent device as claimed in claim 6, wherein the dioxide and the more highly conductive material are disposed in different layers, the dioxide layer being disposed nearer to the dielectric material.

References Cited in the file of this patent

UNITED STATES PATENTS

| | | |
|---|---|---|
| 1,238,660 | Field-Frank | Aug. 28, 1917 |
| 2,566,349 | Mager | Sept. 4, 1951 |

FOREIGN PATENTS

| | | |
|---|---|---|
| 454,847 | Great Britain | Oct. 5, 1936 |